(No Model.)

F. S. OSGOOD.
BUTTER FIRKIN.

No. 492,470. Patented Feb. 28, 1893.

Witnesses.
David G. Walter.
L. E. Brown.

Inventor.
Frederick S. Osgood
By Hewou Hall
His Atty.

UNITED STATES PATENT OFFICE.

FREDERICK S. OSGOOD, OF TOLEDO, OHIO.

BUTTER-FIRKIN.

SPECIFICATION forming part of Letters Patent No. 492,470, dated February 28, 1893.

Application filed August 1, 1892. Serial No. 441,790. (No model.)

*To all whom it may concern:*

Be it known that I, FREDERICK S. OSGOOD, a citizen of the United States, residing at Toledo, Lucas county, Ohio, have invented certain new and useful Improvements in Butter-Firkins, of which the following is a specification.

My invention relates to that class of receptacles for butter in which the butter is packed in a glass or glazed earthen crock or jar, and in which the jar is placed in another receptacle, the two having between them some soft or elastic substance by which the glass or earthen vessel is protected from shocks and jars which would fracture or break the inner vessel. Heretofore the packing between the two vessels has been heavy, cumbersome and extremely difficult to keep sweet and clean.

Figure 1:
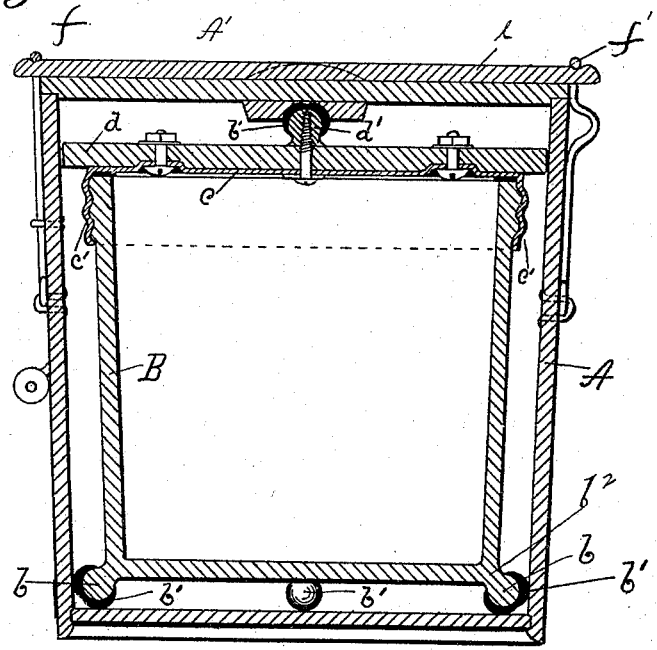
Figure 2:
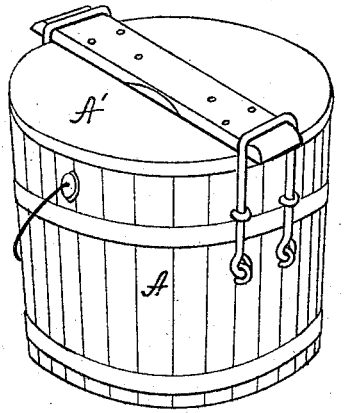
Figure 3:
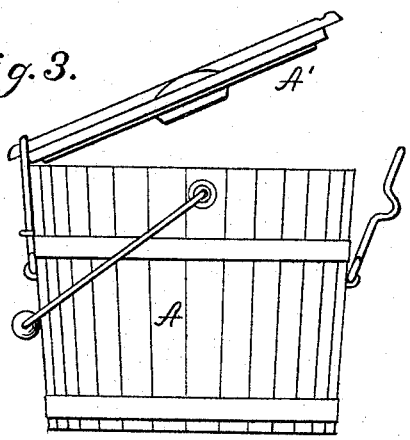

The object of my invention is to provide a butter firkin of the above described class which shall be simple, cheap, durable and effective, and which shall avoid the objections above pointed out. I attain these objects by means of the device hereinafter described, and shown in the accompanying drawings, made part hereof, in which Figure 1, is a central, vertical, sectional view of my device; Fig. 2, a perspective view of the same with the lid of the outer vessel closed, and Fig. 3, an elevation of the same with said lid raised.

Like letters of reference indicate like parts throughout the several views.

In the drawings A is the outer vessel composed preferably of wood. In practice, this vessel is usually a large, wooden tobacco-bucket or pail.

B is the inner vessel composed of glazed earthenware or glass, preferably the latter. Upon the lower, outer angle of vessel B, formed by the meeting side and bottom of the vessel, are spherical knobs, $b$, constructed integral with the vessel and having shank or neck $b^2$; these knobs are inclosed in and embraced by an india rubber covering $b'$. This india rubber covering consists of a hollow ball, the mouth of which is stretched open and forced over the knob $b$, the ball or covering being now held firmly in place by its own resiliency. The knobs $b$ with their elastic covering exactly fit the space between the vessels A and B, as shown in Fig. 1.

The top of vessel B is screw-threaded exteriorly and is provided with a cover, $c$, preferably of sheet metal with a downwardly turned threaded rim, $c'$, the cover $c$ being adapted to be screwed as a cover upon vessel B. Upon the upper side of and attached to the cover $c$ is a strip of wood $d$, the ends of which project so as to touch the inner side of vessel A. To this strip $d$ is attached on its upper side a knob $d'$ also provided with an india rubber covering $b'$, the same as above described.

Vessel A is provided with a removable lid A', which, when in place, presses down closely upon the upwardly projecting knob $d'$ and its elastic covering, as shown in Fig. 1. Knob $d'$ and its elastic covering should rest in a countersunk recess in the under side of the covering A'.

Lid A' has a strip $e$, attached to its upper side, the ends of which strip project beyond the sides of the vessel A and which ends are engaged by iron loops or ears $f f'$ attached to and projecting upwardly from the sides of vessel A and resting in suitable depressions in the piece $e$. Loop or ear $f$ may be fixed rigidly and $f'$ may be pivotally attached as shown. One end of piece $e$ is inserted into loop $f$, and loop $f'$ is pressed up over the opposite end of the piece $e$, and the lid is now held firmly in place.

The operation of my device is obvious: The inner vessel having its lid $c$ screwed in place is placed within the outer vessel A and the lid or covering of the latter vessel is secured in place. The knobs $b$ with their elastic coverings $b'$ rest in the inner angle formed by the meeting side and bottom of the outer vessel A, and the lid A' presses downwardly upon knob $d'$ and its elastic covering. The inner vessel is now elastically cushioned in all directions by means of its knobs and their india rubber coverings, and the whole package, when the parts are assembled, may be subjected to rough usage without breaking or fracturing the glass or earthen vessel.

The advantage of my device is that both vessels may be easily cleansed and kept clean, and that the two vessels may be used separately if desired for other purposes than as a firkin.

What I claim as my invention, and desire to secure by Letters Patent, is—

1. In a butter-firkin, the herein described vessel, (B) knobs (b) on said vessel, necks or shanks ($b^2$) connecting said vessel and said knobs, and elastic coverings clasping said knobs, substantially as shown and described for the purpose specified.

2. A butter-firkin comprising in its construction an outer vessel, an inner vessel, having knobs $b$ connected therewith by necks or shanks $b^2$ detachable lids on each of said vessels, and elastic cushions clamping said knobs interposed between said two vessels, substantially as shown and described, for the purpose specified.

FREDERICK S. OSGOOD.

Witnesses:
FREDERICK L. GEDDES,
L. E. BROWNE.